(12) United States Patent
Schenk et al.

(10) Patent No.: US 9,415,448 B2
(45) Date of Patent: Aug. 16, 2016

(54) POWER DRILL WITH ADJUSTABLE TORQUE

(71) Applicants: Peter Schenk, Niederstotzingen (DE); Markus Nusser, Baechingen (DE)

(72) Inventors: Peter Schenk, Niederstotzingen (DE); Markus Nusser, Baechingen (DE)

(73) Assignee: ROEHM GMBH, Sontheim (DE)

(*) Notice: Subject to any disclaimer, the term of this patent is extended or adjusted under 35 U.S.C. 154(b) by 648 days.

(21) Appl. No.: 13/689,820

(22) Filed: Nov. 30, 2012

(65) Prior Publication Data

US 2013/0133908 A1 May 30, 2013

(30) Foreign Application Priority Data

Nov. 30, 2011 (DE) .......................... 10 2011 055 869

(51) Int. Cl.
*B23B 45/00* (2006.01)
*B25B 21/00* (2006.01)

(52) U.S. Cl.
CPC ............... *B23B 45/008* (2013.01); *B25B 21/00* (2013.01); *B23B 2231/06* (2013.01); *B23B 2260/0445* (2013.01)

(58) Field of Classification Search
CPC ..................... B23B 45/008; B23B 2260/0445; B23B 2231/06; B25B 21/00
USPC .......................................................... 173/47
See application file for complete search history.

(56) References Cited

U.S. PATENT DOCUMENTS

| 5,704,433 | A * | 1/1998 | Bourner et al. | 173/48 |
|---|---|---|---|---|
| 5,897,454 | A * | 4/1999 | Cannaliato | 475/265 |
| 6,431,289 | B1 * | 8/2002 | Potter et al. | 173/47 |
| 7,314,097 | B2 * | 1/2008 | Jenner et al. | 173/48 |
| 8,387,719 | B2 * | 3/2013 | Scrimshaw et al. | 173/47 |
| 2004/0211576 | A1 * | 10/2004 | Milbourne et al. | 173/48 |
| 2010/0163261 | A1 * | 7/2010 | Tomayko et al. | 173/47 |
| 2010/0200257 | A1 * | 8/2010 | Scrimshaw et al. | 173/47 |
| 2012/0274035 | A1 | 11/2012 | Schenk | |

* cited by examiner

*Primary Examiner* — Thanh Truong
*Assistant Examiner* — Dianne Mitchell
(74) *Attorney, Agent, or Firm* — Andrew Wilford

(57) ABSTRACT

A power drill has a housing holding a planetary gear transmission and a motor. A drive stem rotatable in the housing about the axis is rotationally coupled to the planet carrier, and a chuck body is rotatable on the housing. A driver axially bearing on the jaws is axially shiftable to position jaws in the chuck, and a sleeve threaded to the driver is rotatable to position the jaws in the chuck body. The drive stem can be coupled either to the chuck body for rotating a tool held by the jaws in a screw or drill mode or to the sleeve in a tighten/loosen mode for tool exchange. A first spring bears axially inward against a front face of the transmission ring gear with an adjustable axially inwardly directed force, and a second spring bears axially against a rear face of the ring gear.

8 Claims, 16 Drawing Sheets

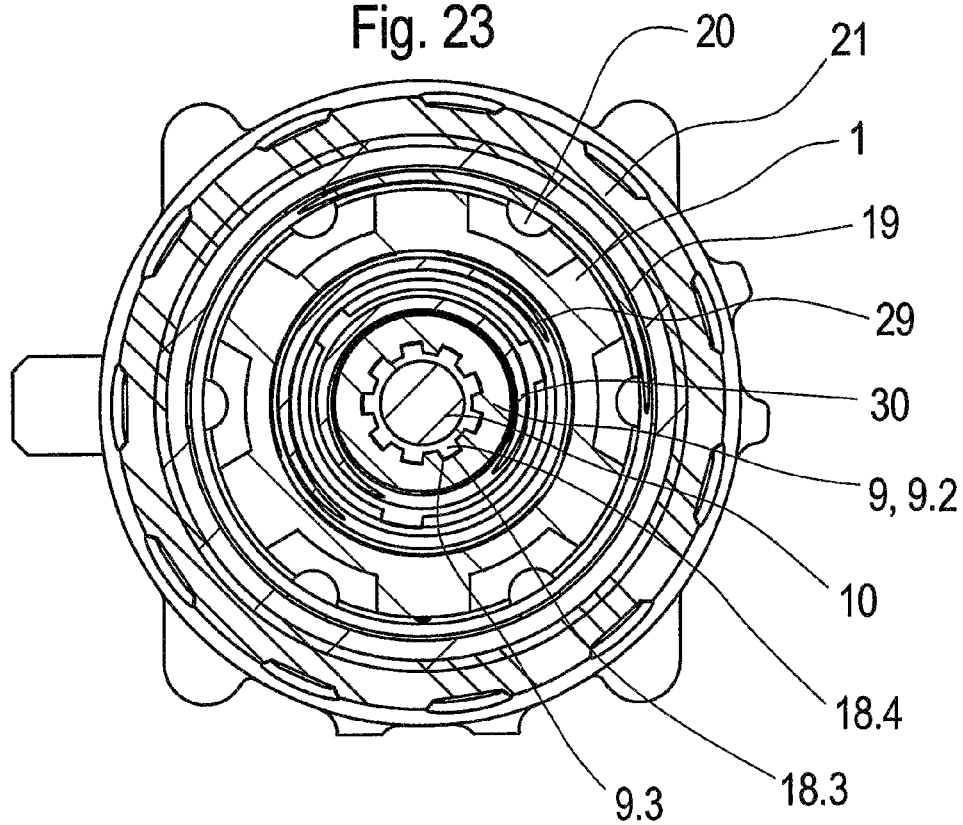
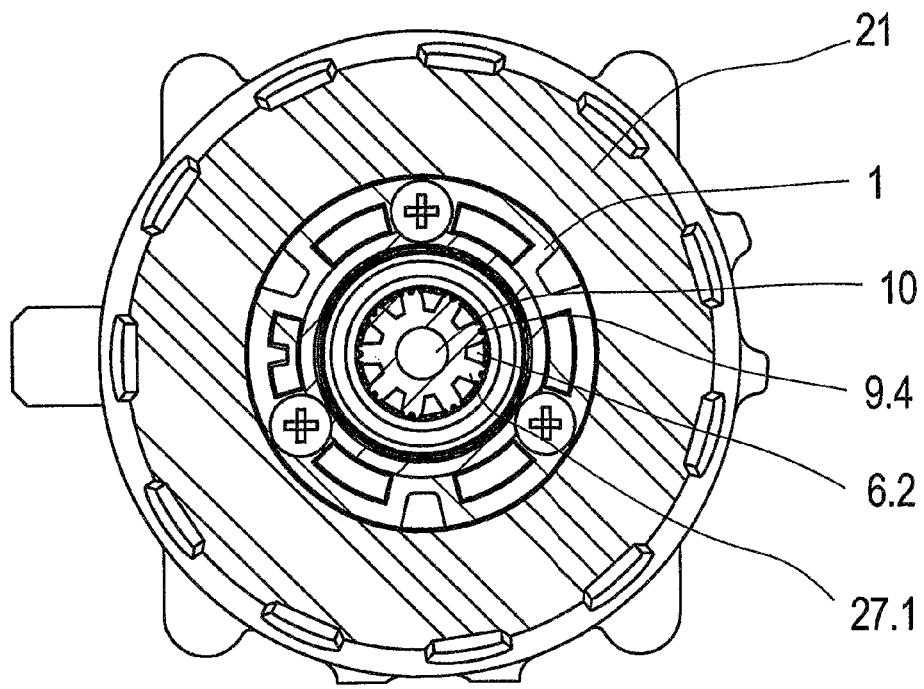

POWER DRILL WITH ADJUSTABLE TORQUE

FIELD OF THE INVENTION

The present invention relates to a power drill. More particularly this invention concerns such a drill that can be used for high-torque drilling and low- or adjustable-torque screwing.

BACKGROUND OF THE INVENTION

A typical power drill has a housing, a drive spindle that can be driven by a motor, and a chuck including a chuck body in which jaws are guided that are adjustable by a threaded connection provided between a driver and a threaded sleeve. A drill spindle and an axially displaceable drive stem can be driven by a motor from its end facing the drive spindle by a planetary transmission composed of a sun gear, a planet carrier supporting planet gears, and a ring gear, and comprising a control element.

A power drill of this type has been disclosed in US 2012/0274025. The power drill shown here can be switched between the tighten/loosen and drill modes by axial movement of a drive sleeve. The force of the drive spindle in this power drill is transferred to the sun gear of the planetary transmission. The sun gear drives the planet gears supported on the planet carrier that rolls along the ring gear, which is rotationally fixed to the housing, with the result that planet carrier rotates, that is is driven, which in turn drives the drive stem through the drive sleeve. The gear ratio of the planetary transmission here is always constant here. This entails the disadvantage that the same torque is always applied to the drive stem during the drilling action and gripping action.

OBJECT OF THE INVENTION

The object of this invention is therefore to provide a power drill of the type reference above that allows for varying torque loads for the power drill in different operating modes.

SUMMARY OF THE INVENTION

This object is achieved according to the invention in that a locking element and a gripping element are provided parallel to the force transmission chain of the drive stem, which elements are rotationally fixed to the housing and can be moved axially by adjusting the control element between the operating modes of the power drill so as to vary the torque acting on the drive stem.

This provides the advantage that the maximum effective torque can be reduced in the screw and/or tighten/loosen modes vis-à-vis the maximum torque in the drill mode.

It is especially advantageous for the ring gear to have at least one latch seat for the at least one locking projection of the locking element. This locking projection can be used to rotationally secure the ring gear to the housing, thereby preventing the ring gear from turning relative to the housing in response to every effective torque, thereby enabling the maximum possible torque to be transmitted to the drive stem and the drill spindle.

It is thus especially advantageous that axial movement of the locking element causes the at least one locking projection to engage the at least one latch seat of the ring gear when in the drill mode. Axial movement of the locking element is used here to control the position of the locking projection.

It is also advantageous that axial movement of the locking element causes the at least one locking projection to be retracted from the at least one latch seat when in the screw and tighten/loosen modes. This aspect thus enables the ring gear to be rotationally fixed by a friction clutch to the housing, and this ring gear to turn together with the planet carrier only when a predefined torque has been exceeded, with the result that force is no longer applied to the drive stem.

It is thus also especially advantageous for the ring gear to have an end-cam-including end face on its side opposite the drive spindle for the purpose of interacting with the at least one coupling pin. In order to implement the friction clutch, these end cams can secure the ring gear against turning relative to the housing up to a predetermined torque.

In addition, it is advantageous for the at least one coupling pin to be acted upon by a coil spring so as to effect torque-controlled, rotationally fixed support of the ring gear on the housing, and to be pressed against the end face of the ring gear. A torque-controlled, rotationally fixed support here is the rotationally fixed support of the ring gear relative to the housing until the action of a predetermined torque has been reached. Once this selectable torque has been exceeded, the coupling pins retract against the force of the coil spring and the ring gear can turn relative to the housing, with the result that the rotation of the drive stem is stopped. An embodiment of a friction clutch is also implemented thereby which enables the ring gear to turn relative to the housing whenever a selectable torque has been exceeded. A higher torque is required to release the ring gear from its rotationally fixed support depending on the compression of the coil spring.

It has been found especially advantageous for at least one torque sleeve to be provided to adjust the compression of the coil spring. This provides a simple way for the user to set the compression of the coil spring. The user can compress the coil spring less in order to keep the maximum allowable torque low for the tighten/loosen mode. He/she can increase the compression of the coil spring in the screw mode relative to the compression in the tighten/loosen mode to select a higher maximum allowable torque during the screwing action. Finally, it is also possible for the user to compress the coil spring completely by adjusting the torque sleeve, with the result that the at least one coupling pin can no longer retract from the at least one end cam, and can thus no longer counteract the rotationally fixed connection of the ring gear to the housing so as to provide the maximum possible torque for the drill mode.

It is especially advantageous here for the coil spring to be supported on its side opposite the drive spindle by a spring holding ring that is axially displaceable by the torque sleeve. This spring holding ring functions here to provide proper guidance and compression, or expansion, of the coil spring, preferably inside the torque sleeve.

The approach has proven successful whereby the control element has a control element central hole that enables the drive stem to pass through, at least one locking control element that interacts with a locking element control cam that is provided on the locking element, and at least one gripping control element that interacts with a gripping-element control cam that is provided on the gripping element. This constitutes a simple approach for using the control element to axially actuate both the gripping element and the locking element—specifically, through the interaction of the locking element control cam with the locking control element, and the interaction of the gripping-element control cam with the gripping control element.

It is also advantageous here for the at least one locking control element to be offset radially from the at least one gripping control element relative to the drive stem. This enables the control element to be provided with an annular shape and with very small dimensions, with the result that the power drill remains light and compact.

It is furthermore advantageous for the gripping element to include gripping element central hole that enables the drive stem to pass through, a gripping element extension comprising a gripping element outer teeth, and at least one gripping element guide. The gripping element guide functions here to provide the guided axial movement of the gripping element inside or outside the locking element, and to provide the radial retention of its position. The gripping element itself is used to create the tighten/loosen mode for the power drill, and to retain the drive sleeve or the drill spindle radially in the gripping mode.

It is also useful for the locking element to include a locking element central hole enabling the drive stem to pass through, at least one gripping element guide, and at least one locking-element running surface. This enables the locking element to slide reliably in operation within the gripping element guide, where the locking-element running surface enables the control element to turn relative to locking element.

It is especially advantageous here for a positive engagement to operate between the gripping element and the drill spindle by axial movement of the gripping element when in the tighten/loosen mode and for the drill spindle to be rotationally fixed to the housing, and for the drive stem to be positively engaged with the threaded sleeve by being entrained by the gripping element. This provides a relative rotation of the threaded sleeve vis-à-vis the drill spindle that is rotationally fixed to the housing by the gripping element. The drill spindle itself is rotationally fixed to the chuck body, thereby providing a relative rotation of the threaded sleeve vis-à-vis the stationary chuck body as well, and the driver thus spindles out from or into the threaded connection when the drive stem is actuated. As a result, the jaws that are guided within the cone of the chuck body close or open by being entrained by the driver. In this position, the locking element together with its locking projections is disengaged from the locking receptacle of the ring gear and only the coupling pin contacts the end face of the ring gear.

In another especially preferred embodiment, a positive engagement is activated between the gripping element and the drill spindle in the tighten/loosen mode by axial movement of the gripping element, and the spindle is rotationally fixed thereby to the housing, the drive stem is positively engaged with the threaded sleeve by being entrained by the gripping element, a lock ring is provided to axially secure the position of the at least one coupling pin pressed onto the end face, and the ring gear is supported by a ring gear spring provided on the gear's side facing the drive spindle as to effect torque-controlled, rotationally fixed support relative to the housing. It is not possible in this embodiment for the at least one coupling pin to retract axially from the end cams when a predefined torque is exceeded, which action would thereby enable the ring gear to be released rotationally from the housing. The coupling pins are secured in place by the lock ring in their position when pressed onto the end face of the ring gear. When a predefined torque has been exceeded, the ring gear itself retracts against the spring force of the ring gear spring, specifically toward the drive spindle, with the result that another means of limiting torque is provided by the spring force of the ring gear spring, and another embodiment of a friction clutch is thus provided. It is also possible that this ring gear spring can be varied in terms of its compression.

It is useful here for the ring gear spring to be supported axially rearward, specifically, on the side facing the drive spindle, by a retaining shoulder on the housing or by a circlip. This also enhances the operational reliability of the power drill.

It has also been found especially useful in terms of ease of operation for the control element to be adjustable by means of a mode-control sleeve.

A simple adjustment of the control element is characterized in that the mode-control sleeve has inner teeth and the control element has teeth that are interactively engaged through a control gear supported on a bearing shaft. This provides especially easy switching back and forth between the individual operating modes.

It is also advantageous for the mode-control sleeve to include a number of detent-locking positions corresponding to the operating modes, which positions at least one detent supported on the housing can engage. This detent locking device that is created thereby ensures that the power drill does not re-adjust on its own to another operating mode or that this does not occur due the user's unintentionally touching the control sleeve.

Another preferred approach is one whereby the drive stem has a drive gear on the side opposite the drive spindle, which drive gear is provided in the form of a drive gear teeth. This facilitates creating the positive engagement of the drive stem with the components operated in the force transmission chain.

It has been found preferable for a return element acted upon by a return spring to be supported on the drive gear so as to ensure an operationally reliable movement of the drive stem into the individual operating modes.

In order, in particular, to ensure an operationally reliable gripping and loosening action, it has been found preferable if the return element has a return element teeth that is rotationally fixed to the threaded sleeve preferably in the tighten/loosen mode and the positive engagement with the spindle teeth is negated.

It is also advantageous here for the return spring to be supported on a return collar provided on the threaded sleeve. As a result, the return spring can be reliably positioned in the power drill, and the device can thereby properly reset the drive stem axially rearwardly, that is, toward the drive spindle.

It is also especially advantageous for an abutment ring to be carried on the drive stem, which abutment ring functions to axially couple the drive stem to the gripping element. As a result, the drive stem can be entrained by movement of the gripping element.

It is also advantageous here if the drive stem has a carrier shoulder and/or a carrier groove. An abutment ring can be positioned in this type of carrier groove, while the carrier shoulder functions so as to be acted upon by the gripping element and to guide this axially forward toward the tool holder.

In order to adjust the locking element and the gripping element operationally reliably in their positions effecting the respective operating mode, it has been found preferable for the locking element to be acted upon by a locking element spring and/or for the gripping element to be acted upon by a gripping element spring.

It is furthermore advantageous for the drill spindle to be provided in multi-part form, preferably composed of a machine tube shaft and a drive sleeve that is rotationally fixed to this spindle. This facilitates producing the components driving the chuck, thereby also facilitating installation of the chuck.

Finally, the approach has been found preferable whereby a drive sleeve that is rotationally fixed to the drive stem is positively engaged with the planet carrier. A standard planetary transmission can be used since the planet carrier does not have to be created separately with a contour that provides a rotationally fixed but axially releasable positive engagement with the drive stem.

BRIEF DESCRIPTION OF THE DRAWING

The above and other objects, features, and advantages will become more readily apparent from the following description, reference being made to the accompanying drawing in which:

FIGS. 20, 21, 22, 23, and 24 are sections taken along respective lines XX-XX, XXI-XXI, XXII-XXII, XXIII-XXIII, and XXIV-XXIV of FIG. 19.

DETAILED DESCRIPTION

Figure 1:
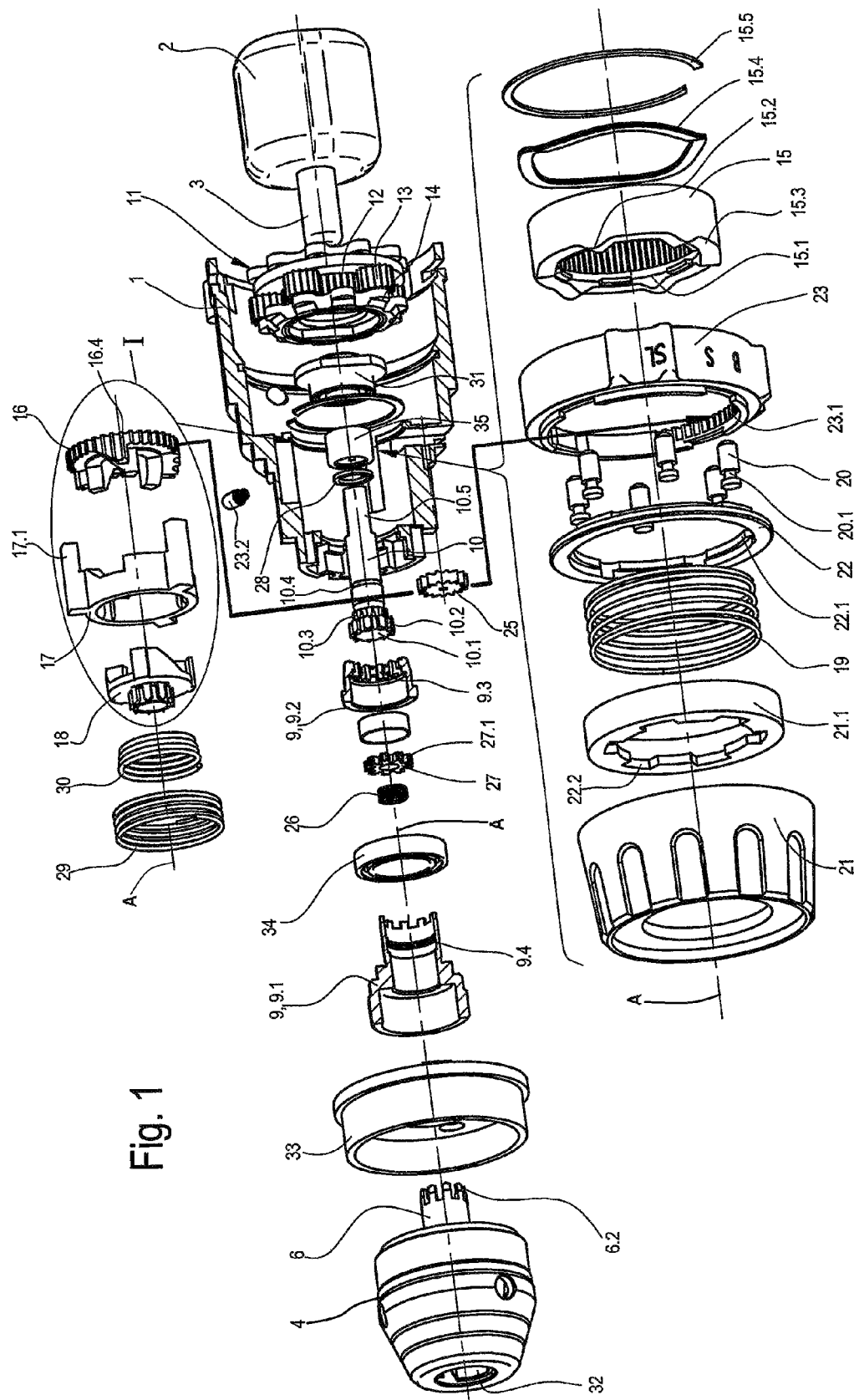
FIGS. 1 and 2 are exploded and partly sectional views of the power drill according to the invention, respectively from the front and from the rear.
Figure 2:
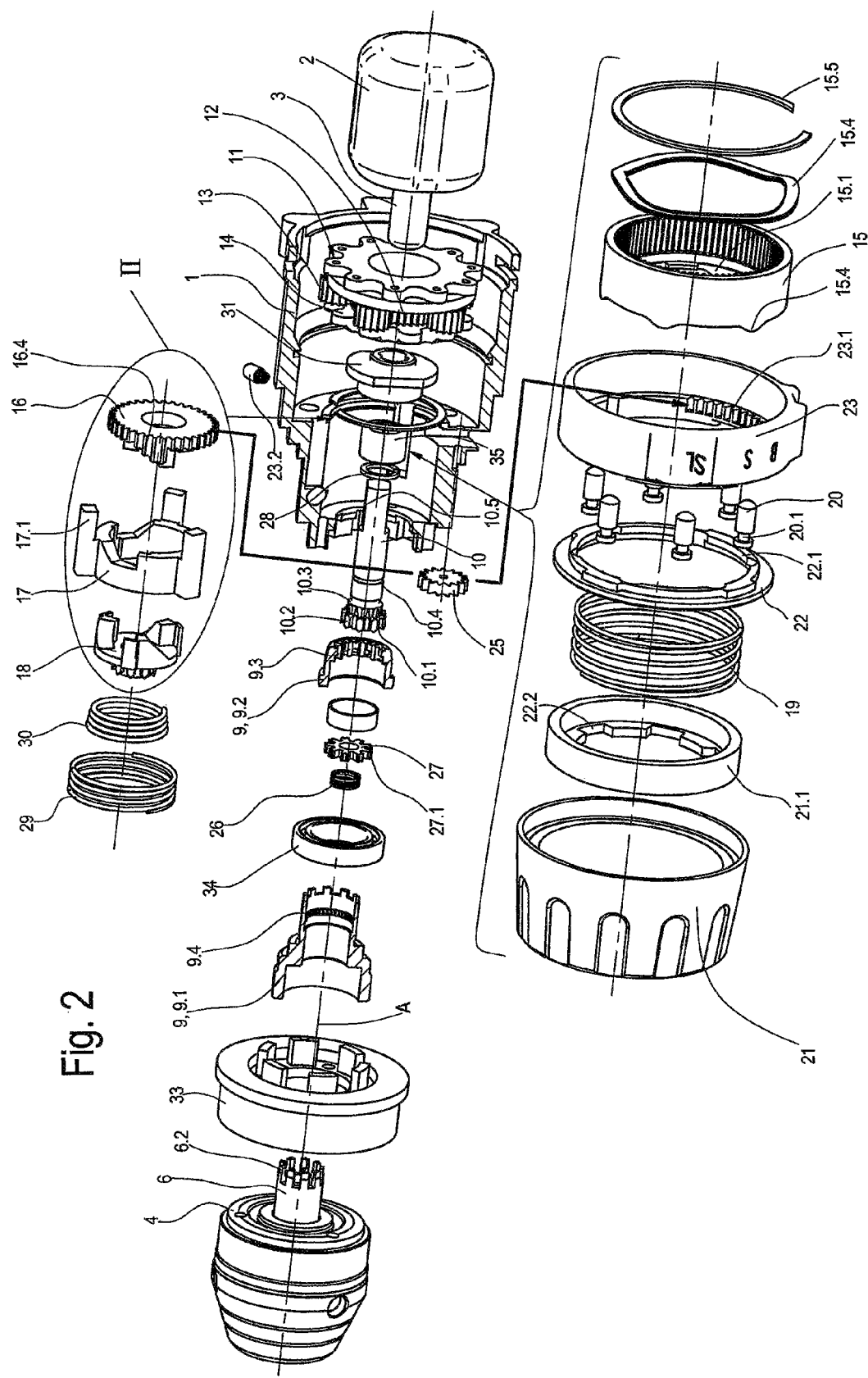

FIGS. 1, 2, 8, and 9 show part of a power drill that has a housing 1 and a drive spindle 3 rotated by a motor 2 about an axis A. The power drill furthermore has a chuck body 4 that forms a tool holder 32 and in which jaws 8 (FIG. 8) are guided that can be moved by a threaded connection 7 between a driver 5 and a threaded sleeve 6. The chuck body 4 has a drill spindle 9 and an axially displaceable drive stem 10 that can be driven as described in detail below by the motor 2 from the side facing the drive spindle 3 by a planetary transmission 11 composed of a sun gear 12, a planet carrier 14 supporting planet gears 13, and a ring gear 15. A control element 16 is also part of the power drill.

A locking element 17 and a gripping element 18 are provided parallel to the force transmission chain of the drive stem 10 and are rotationally fixed to the housing 1 and axially displaceable by movement of the control element 16 (FIG. 10) in order to vary the torque acting on the drive stem 10 when switching between the drill, screw, or tighten/loosen modes. The ring gear 15 has multiple latch seats 15.1 for three locking projections 17.1 of the locking element 17 (FIG. 1). The latch seats 15.1 here can be sized so that the locking projections 17.1 can engage them either with or without angular play. It is also possible to provide more than three or fewer than three locking projections 17.1. The ring gear 15 also has a front end face 15.3 formed with three end cams 15.2 on its side opposite the drive spindle 3.

FIGS. 1, 2, 8, 12, 15, 16, and 18 show that six coupling pins 20 are pressed by a coil spring 19 axially rearward against the front end face 15.3 of the ring gear 15 in the illustrated embodiment. These coupling pins 20 are only axially movably mounted in the housing 1 and provide torque-controlled rotationally fixed support for the ring gear 15 relative to the housing 1. It is also possible for more or fewer than six of the coupling pins 20 to be provided, and it is also possible for the coupling pins 20 to each be acted upon by a separate coil spring 19, with the result that multiple springs 19 can be used. A guide groove can also be provided on the front end face 15.3 of the ring gear 15 to receive the coupling pins 20. A torque sleeve 21 is provided for setting the compression of the coil spring 19, and the coil spring 19 is supported on a front end opposite the drive spindle 3 by a spring-retaining ring 21.1 that can be axially positioned by the torque sleeve 21. The ring gear 15 bears axially rearwardly against a ring-gear spring 15.4 that in turn is secured axially in the housing 1 by a snap ring or circlip 15.5. The circlip 15.5 shown here is not closed circumferentially, thereby enabling it to be easily inserted into the housing 1 by elastically compressing its free ends. It is equally possible to provide a securing shoulder on the housing 1 to retain the ring gear spring 15.4 in its position.

Figure 11:
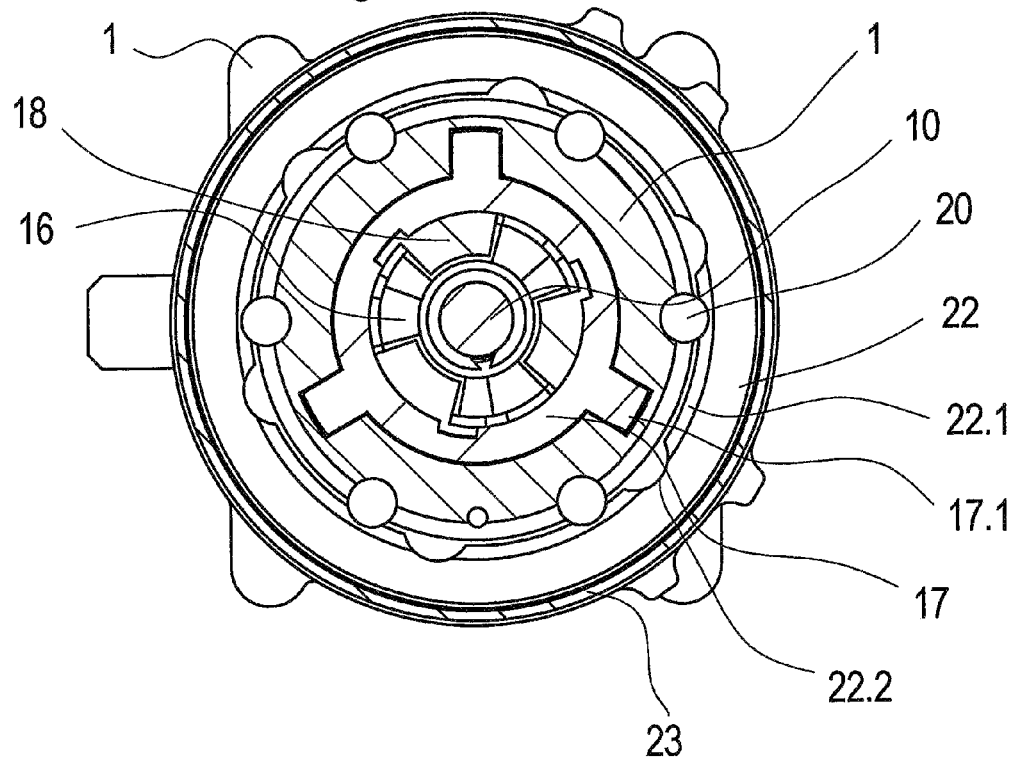
Figure 12:
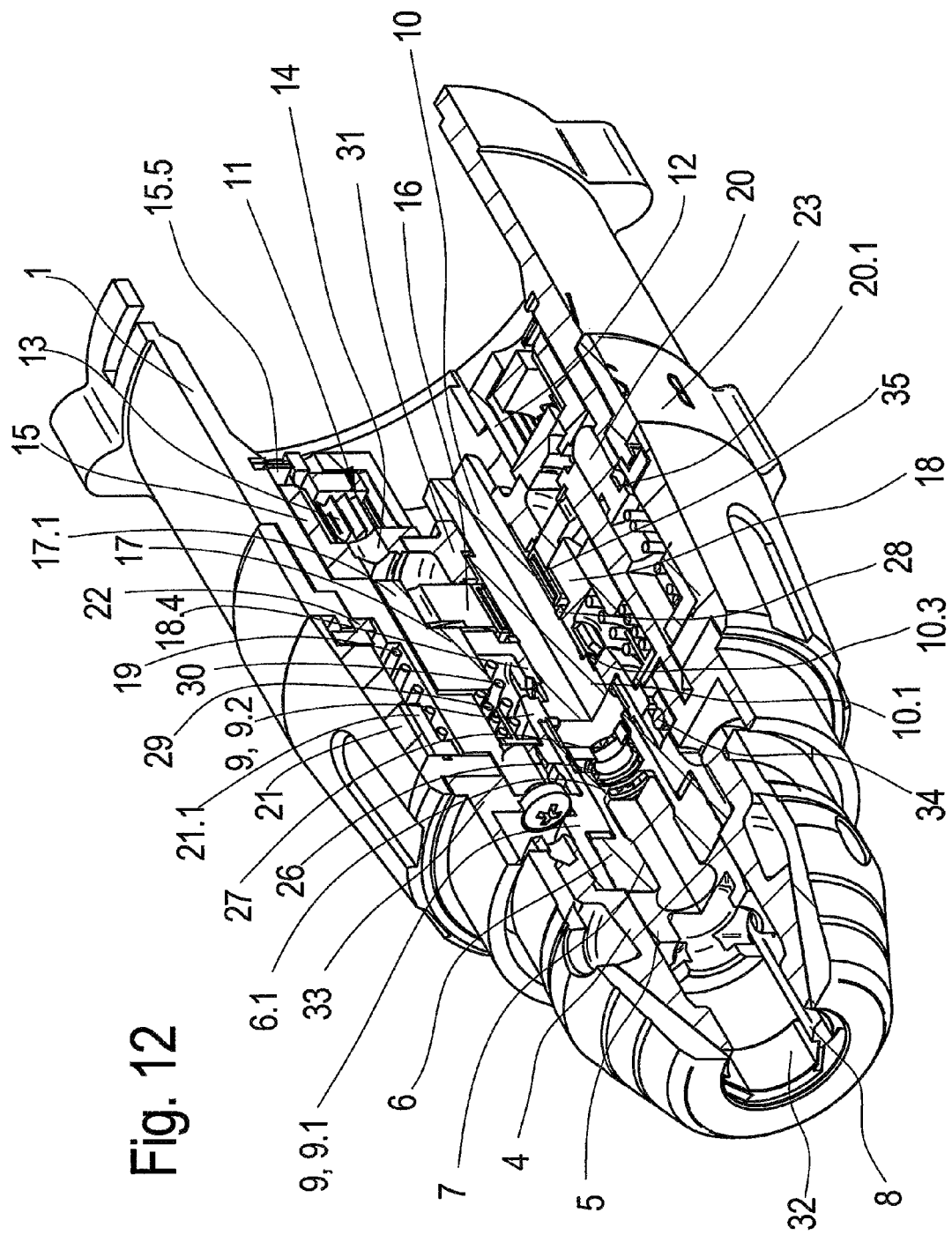
FIG. 12 is a view like FIG. 8 of the power drill in the screw mode.

The coupling pins 20 are each formed with a groove 20.1 allowing them to be axially fixed by a shoulder 22.1 provided on a lock ring 22. This lock ring 22 here has multiple pin guides 22.2 (FIG. 11). In addition, the coupling pins 20 are tapered at their rear ends facing the ring gear 15.

The drive stem 10 has on its front end a drive gear 10.1 provided with teeth 10.2. Adjacent the teeth 10.2, that is axially offset rearward toward the drive spindle 3, a support shoulder 10.3 is provided that bears against the gripping element 18. Rearward therefrom there is a groove 10.4 (FIGS. 1 and 2) formed in the drive stem 10 and receiving an abutment ring 28. In addition, a return spring 26 is provided that biases a return element 27 axially rearward against the drive gear 10.1. The return element 27 has external teeth 27.1 that can engage complementary teeth 6.2 provided on the threaded sleeve 6. The return spring 26 bears axially forward on a return collar 6.1 (FIGS. 8, 9, and 12) provided on the threaded sleeve 6. Flats 10.5 are provided on the axially rearward end of the drive stem 10 provide a rotationally fixed but axially extensible connection to a drive bushing 31 that is rotationally fixed to the planet carrier 14. However, it is also appropriate and sufficient to provide only one flat 10.5 on the drive stem 10.

Figure 10:
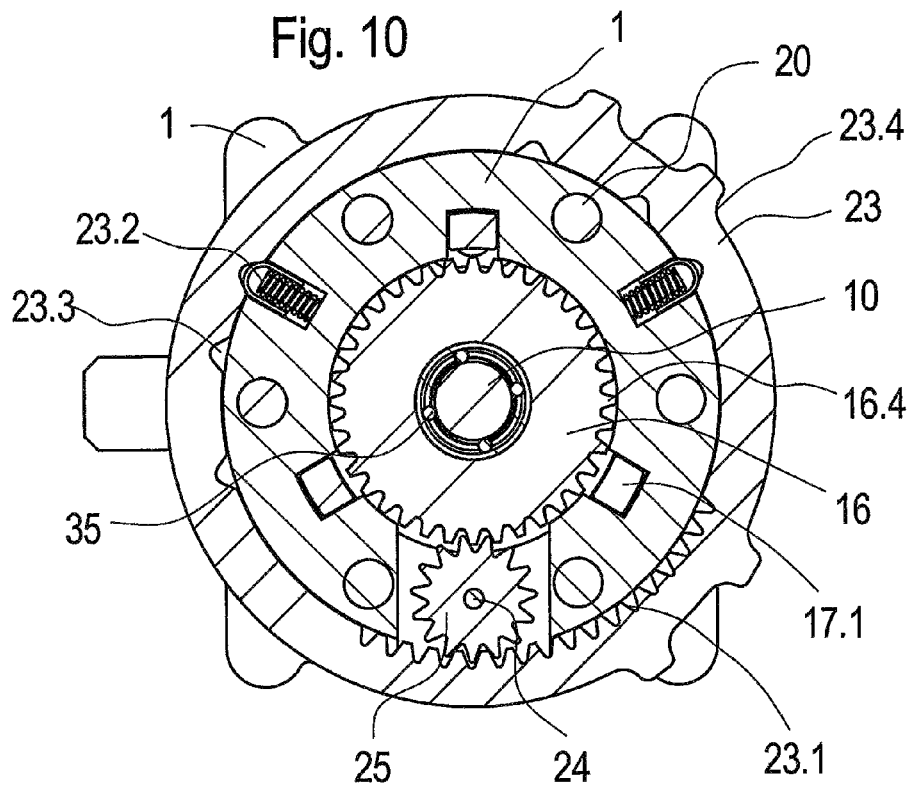
FIGS. 10 and 11 are sections taken along respective lines X-X and XI-XI of FIG. 9.
Figure 14:
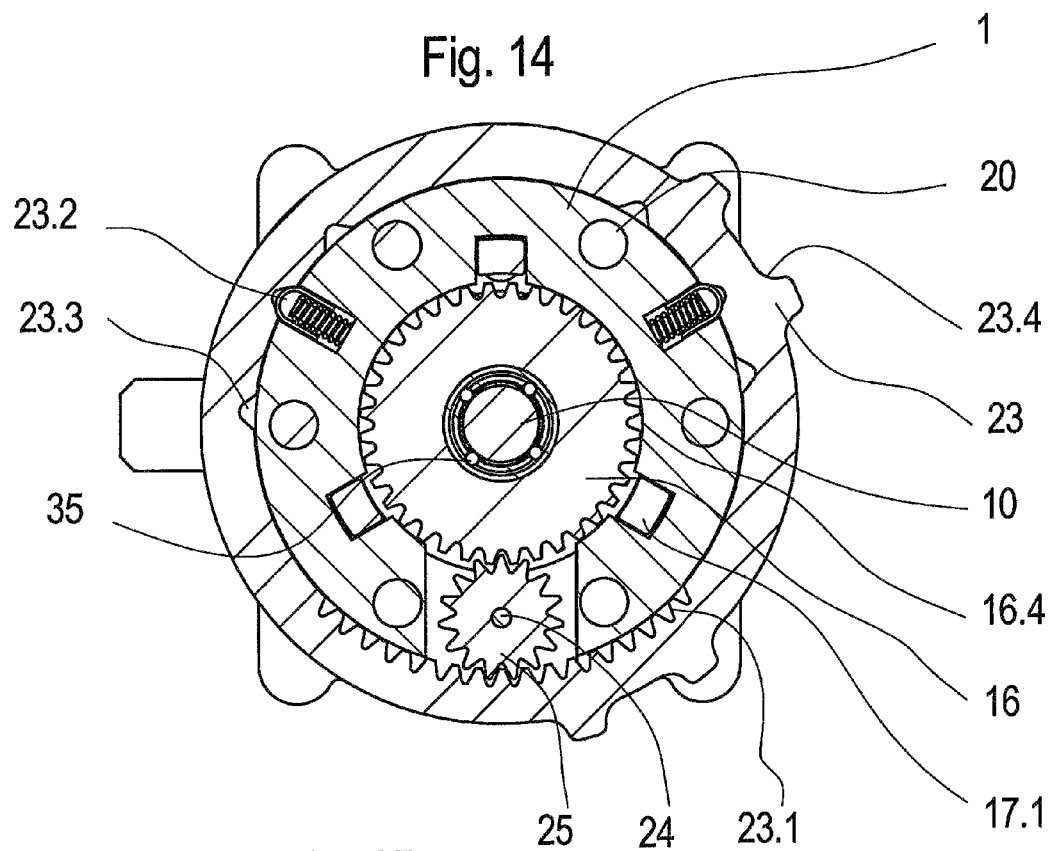
FIGS. 14, 15, 16, and 17 are sections taken along respective lines XIV-XIV, XV-XV, XVI-XVI, and XVII-XVII of FIG. 13.

The gripping element 18 is acted upon by a respective spring 30, while the locking element 17 is acted upon by a respective spring 29. The control element 16 is axially fixed and can be rotated by a mode-control sleeve 23 (FIG. 10). This mode-control sleeve 23 has inner teeth 23.1 and the control element 16 has teeth 16.4 that mesh therewith via a control gear 25 (FIGS. 1 and 2) mounted on a bearing shaft 24 (FIG. 14). The control-element teeth 16.4 in the embodiment are disposed around the entire outer circumference of the control element 16. The control-sleeve inner teeth 23.1, conversely, are provided on the mode control sleeve 23 only in a circular segment extending over approximately two thirds of the inner circumference of the control sleeve 23. It is also possible instead to configure the control-sleeve inner teeth 23.1 circumferentially continuously, or to configure the control-element teeth 16.4 only in the form of a segment. In addition, the mode-control sleeve 23 has three detent positions 23.3 (FIG. 10) corresponding to the three operating modes, and is provided with exactly two detents 23.2 that are supported by respective springs on the housing 1. In the example shown, the mode-control sleeve 23 interacts with the lock ring 22 so as to operate the coupling pins 20. It is also equally possible, however, to provide an additional sleeve whose actuation is responsible for the coupling pins 20.

Figure 7:
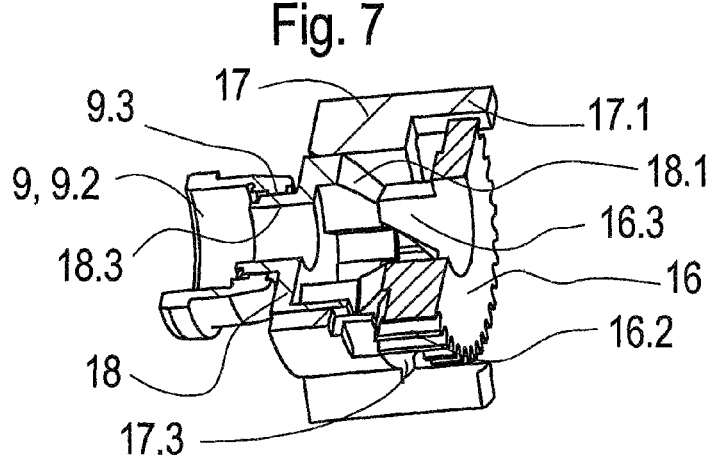
Figure 8:
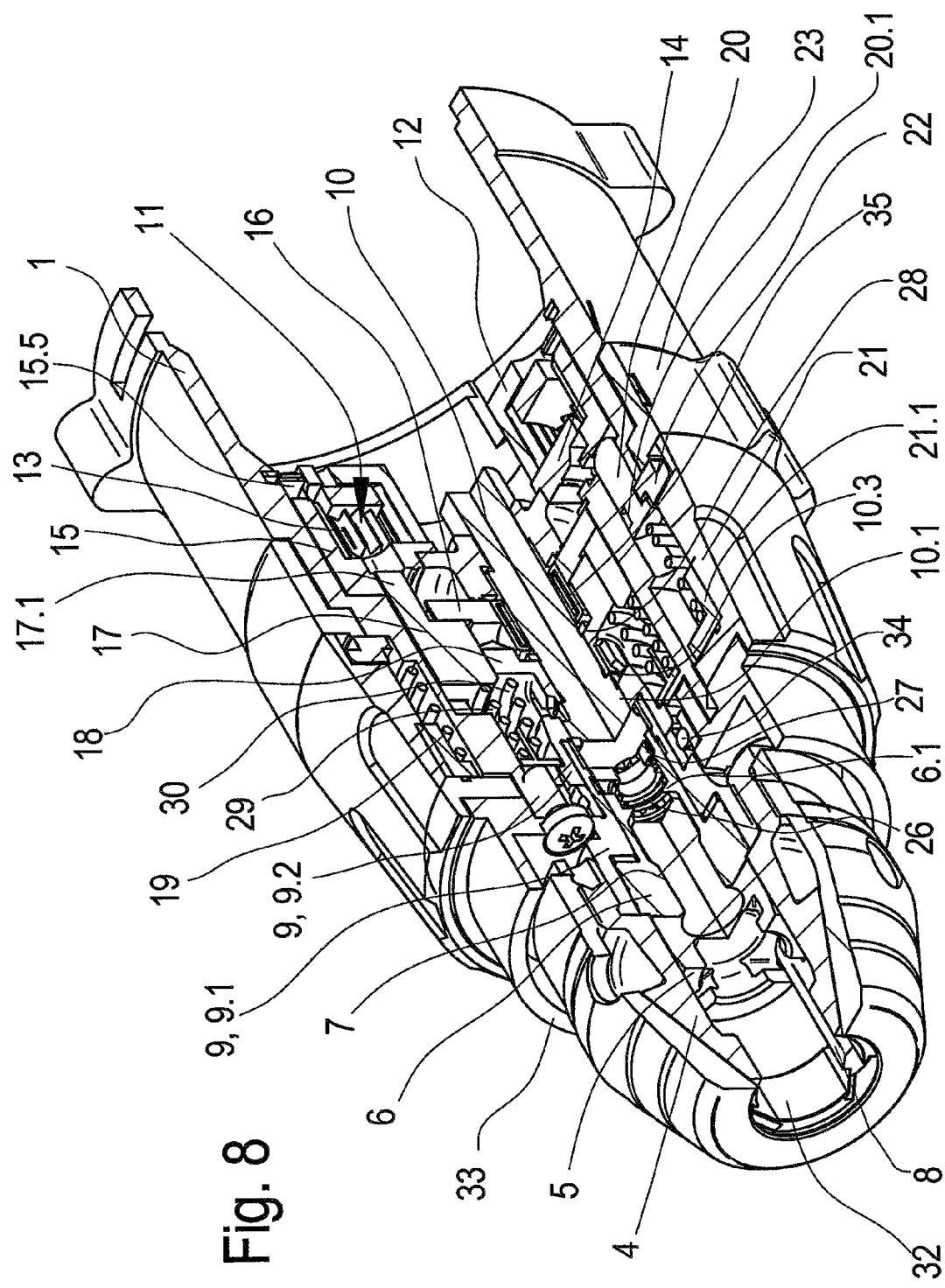
FIG. 8 is a perspective partly sectional view of the power drill in the drill mode.
Figure 9:
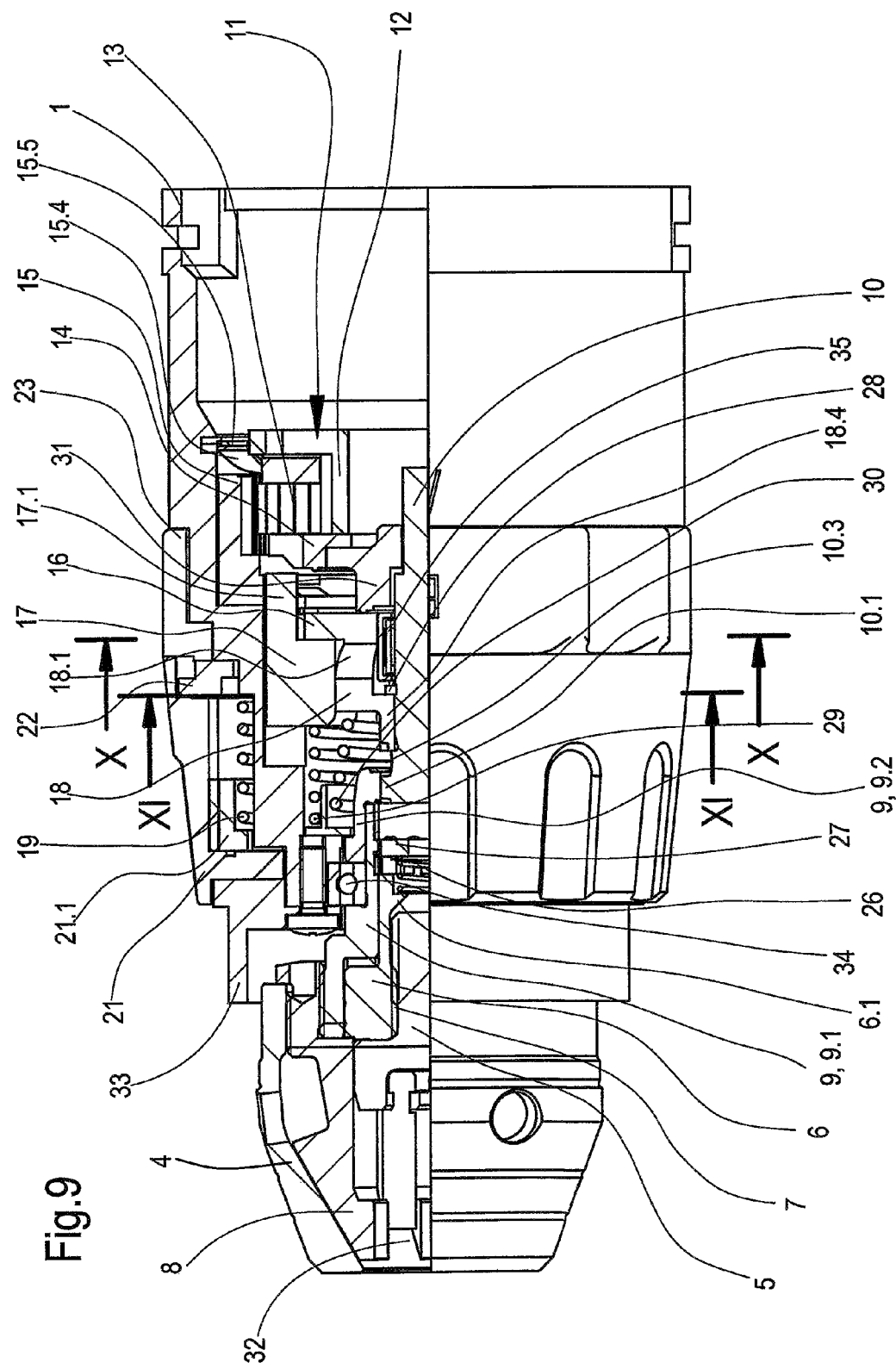
FIG. 9 is a partly sectional side view of the power drill in the drill mode.

The drill spindle 9 in the embodiment shown is of multipart design and is composed of a tube shaft 9.1 and a drive sleeve 9.2 that is at least rotationally fixed to this spindle (FIGS. 1, 8, 9). The drive sleeve 9.2 shown here has inner teeth 9.3 (FIGS. 5-7) that can interact with the drive-gear teeth 10.2 and the gripping element 18. The tube shaft 9.1 as shown, on the other hand, has internal spindle teeth 9.4 that can engage the teeth 27.1 of the return element 27. A cover cap 33 is also provided as dust protection. In addition, a bearing 34 is provided between the tube shaft 9.1 and the chuck body 4, a needle bearing 35 furthermore being provided between the control element 16 and the drive stem 10.

Figure 3:
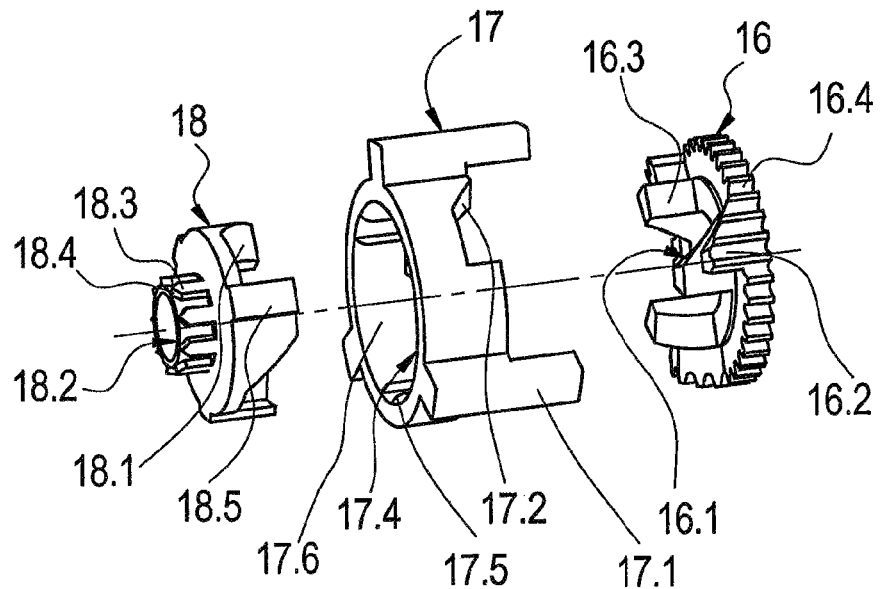
FIGS. 3 and 4 are large-scale views indicating the elements indicated at I and II in FIGS. 1 and 2.
Figure 4:
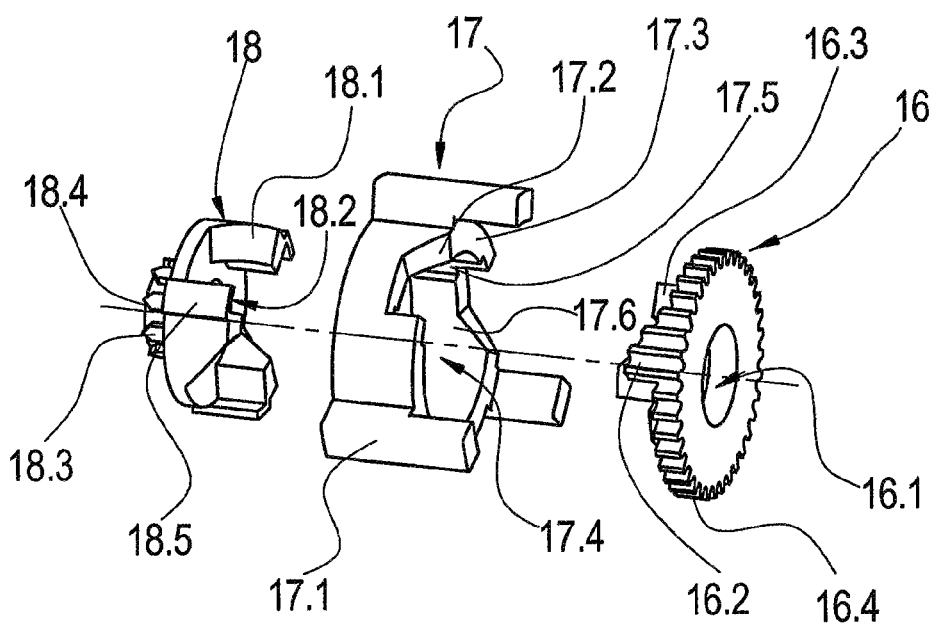

It is evident in FIGS. 3 and 4 that the control element 16 has a central hole 16.1 through which the drive stem 10 passes axially, and, in the embodiment shown, three locking control elements 16.2 are formed that interact with three control cams 17.2 provided on the locking element 17, and three axially projecting gripping control elements 16.3 are also formed on the control element 16 that interact with three axially effective control cams 18.1 provided on the gripping element 18. The locking control elements 16.2 are radially offset relative to the gripping control elements 16.3 inward toward the drive stem 10. In addition, the gripping control elements 16.3 have a different pitch, a different axial dimension, and a different angular dimension from the locking control elements 16.2. The length of circular arc here denotes the angular extent of locking for the control element 16.2 or gripping for the control element 16.3. In the embodiment shown, one of the locking control elements 16.2 extends around approximately one ninth of the circumference, while one of the gripping control elements 16.3 extends around approximately one eighth of the circumference of the control element 16. The gripping control elements 16.3 are axially longer than the locking control elements 16.2 in the embodiment shown.

The gripping element 18 itself has a central hole 18.2 through which the drive stem 10 passes, an extension 18.4 with outer teeth 18.3, and, in the preferred embodiment, exactly three guides 18.5. The gripping-element outer teeth 18.3 can mesh with the teeth 9.3 of the drive sleeve 9.2. It is also conceivable here for the drive sleeve 9.2 to instead have outer teeth, and for the gripping element 18 to have inner teeth.

In the illustrated embodiment, the locking element 17 itself has a central hole 17.4 through which the drive stem 10 passes, and exactly three guides 17.5 provided on an inner wall 17.6 to guide the gripping-element guides 18.5 on the gripping element 18. In addition, a locking-element running surface 17.3 is provided on the locking element 17 on which the control element 16 can slide.

Figure 5:
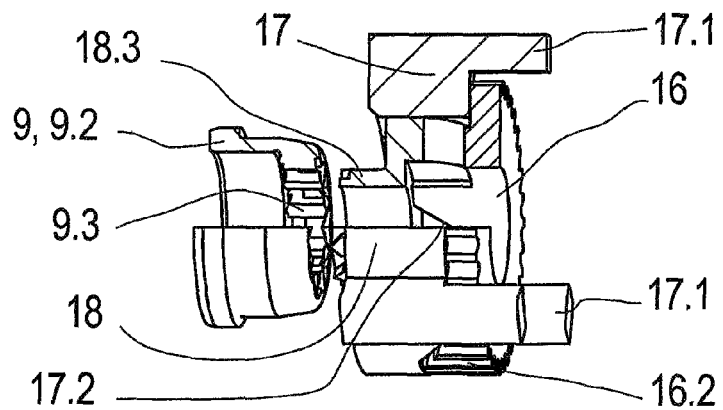
FIGS. 5, 6, and 7 are partly sectional views of the structure indicated at I in FIG. 1, respectively in the drill, screw, and tighten/loosen positions of the drive sleeve.

FIG. 5 shows the position of the gripping element 18 and of the locking element 17 in relation to the control element 16 when in the drill mode indicated by a "B" on the mode-control sleeve 23. Here, the drive sleeve 9.2 rotationally fixed to the tube shaft 9.1 is also illustrated for the sake of clarity. The locking element 17 is pressed axially rearward against the locking control element 16.2 by the locking-element spring 29, and the gripping element 18 is pressed axially rearward against the control element 16 by the gripping-element spring 30, while the gripping element 18 and the locking element 17 are rotationally fixed in the power-drill housing 1. The locking control element 16.2 and locking element control cam 17.2 do not interact with each other in this operating mode, with the result that the locking element 17 is displaced axially rearward and the locking projections 17.1 are engaged with the latch seats 15.1 of the ring gear 15 (not shown). The gripping element 18 together with its outer teeth 18.3 is disengaged from the teeth 9.3 of the drive sleeve 9.2, with the result that the sleeve 9 is not rotationally fixed in the housing 1.

Figure 6:
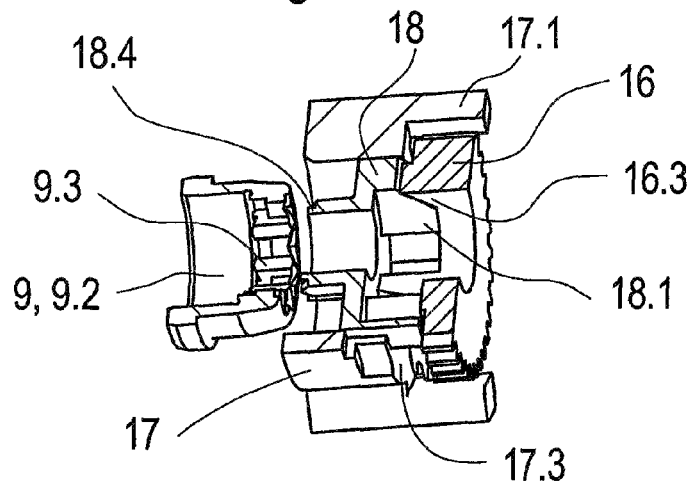

FIG. 6 shows the position of the gripping element 18 and the locking element 17 in relation to the control element 16 when in the screw mode indicated by an S on the sleeve 23. Turning the control element 16, that is, turning the mode-control sleeve 23 slides the locking-control elements 16.2 along the locking element control cams 17.2 until the locking control element 16.2 contacts the locking-element running surface 17.3. Since the control element 16 is axially fixed, the locking element 17 moves axially forward against the force of the locking-element spring 29 toward the jaws 8, and the locking projections 17.1 disengage from the latch seats 15.1 of the ring gear 15. There is no interaction, however, between the gripping control element 16.3 with the gripping-element control cams 18.1 during transition from the drill mode to the screw mode.

FIG. 7 shows the position of the gripping element 18 and of the locking element 17 in relation to the control element 16 in the tighten/loosen mode indicated by an SL on the sleeve 23. Here the gripping control elements 16.3 interact with the gripping control cams 18.1 in response to rotation of the control element 16, with the result that the gripping element 18 is shifted axially toward the jaws 8. The locking control elements 16.2 slide here along locking-element running surface 17.3 without moving the locking element 17. The gripping-element outer teeth 18.3 now engage the drive-sleeve teeth 9.3 of the drive sleeve 9.2 and thereby rotationally fix the drive sleeve 9 in the housing 1.

FIGS. 8 through 11 show the power drill in the drill mode. Here the locking projections 17.1 are engaged with the latch seats 15.1 by axial movement of the locking element 17 to rotationally fix the ring gear 15 relative to the housing 1. The engagement is effected by the spring force of the locking-element spring 23 acting on the locking element 17, which spring presses the element 17 axially rearward, that is toward the drive spindle 3. In addition, the lock ring 22 is engaged by its shoulder 22.1 with the coupling pins 20 that are pressed onto the end face 15.3 of the ring gear 15 including the end cams 15.2.

FIG. 10 shows the control-sleeve inner teeth 23.1 of the mode-control sleeve 23 meshing with the control gear 25 supported on the bearing shaft 24 and with the teeth 16.4 of the control element 16. In addition, the two detents 23.2 are positioned in the respective detent positions 23.3 of the drill mode. The mode-control sleeve 23 has an outer shape 23.4 that facilitates easy manipulation FIG. 11 shows the lock ring 22 with its shoulder 22.1 that engages the ring locating grooves 20.1 of the coupling pins 20. This axially fixes the coupling pins 20, such that they retain the ring gear 15 against rotation relative to the housing 1 by contacting the end face 15.3, in other words, supporting locking projections 17.1. This added fixation by the coupling pins 20 is not absolutely necessary, however. The drive stem 10 is positively engaged with the drive sleeve 9.2 that in turn is connected by positive engagement with the tube shaft 9.1. The drive stem 10 is displaced axially rearward toward the drive spindle 3 such that the return element 27 is positively engaged with spindle teeth 9.4 due to the force of the return spring 26 with its return element teeth 27.1. In an embodiment that is not shown in detail, the return element 27 is not provided and the drive stem 10 is designed so that in drill mode the stem is positively engaged with the threaded sleeve 6 and is positively engaged with the drive sleeve 9.2.

In the drill mode, the power of the motor 2 is transmitted by the drive spindle 3 through the planetary transmission 11 to the drive stem 10. The drive stem 10 is engaged by its drive-gear teeth 10.2 with the teeth 9.3 of the drive sleeve 9.2, thereby driving the tube shaft 9.1. At the same time, the return element teeth 27.1 are engaged by return spring 26 with the spindle teeth 9.4. Relative rotation between the threaded sleeve 6 and the tube shaft 9.1 is impossible since both are coupled together for joint rotation by the drive stem 10. Locking projections 17.1 engaged in the latch seats 15.1 prevent the ring gear 15 from turning relative to the housing 1. As a result, the maximum possible torque can be transmitted to the drive stem 10 in the drill mode.

FIGS. 12 through 17 show the power drill according to the invention in the screw mode. Here locking projections 17.1 are disengaged from the latch seats 15.1 of the ring gear 15 by axial forward shifting of the locking element 17 against the force of the locking-element spring 23. The different levels of compression of the locking-element spring 23 between the drill mode and the screw mode are seen by directly comparing FIGS. 13 and 19. In addition, the coupling pins 20 are acted upon as before by the coil spring 19 and pressed against the front end face 15.3 of the ring gear 15.

FIG. 14 shows that mode-control sleeve 14 is rotated from the position for the drill mode to that of the screw mode. In addition, two detents 23.2 are in the respective detent positions 23.3 of the screw mode, which positions are located between the two detent positions 23.3 for drill and tighten/loosen mode in this embodiment.

Figure 15:
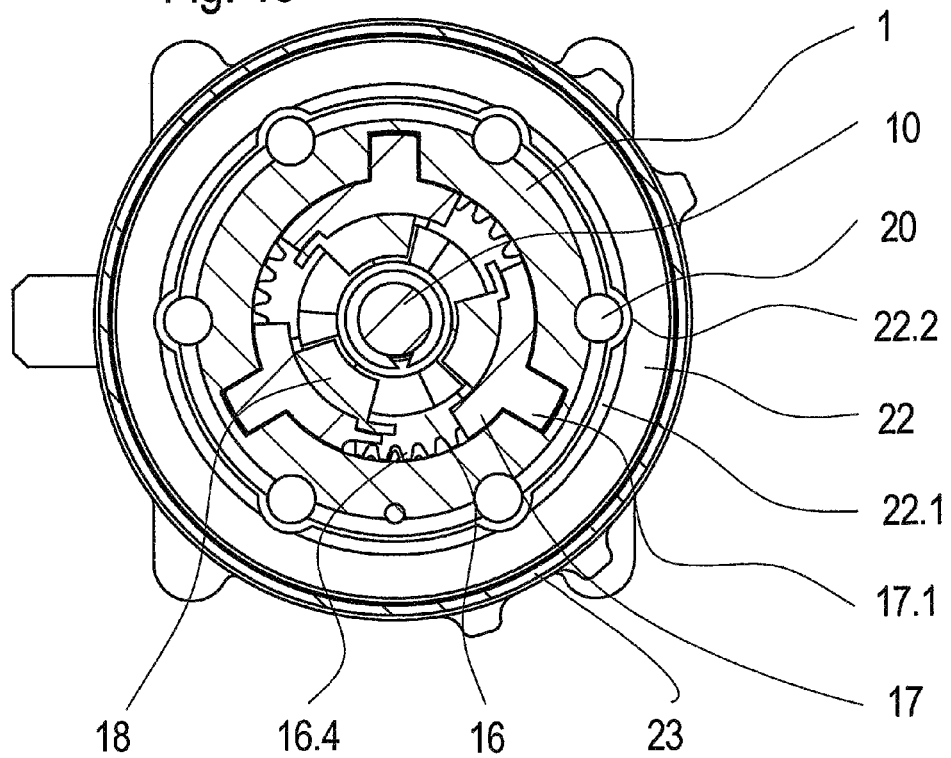

As is evident in FIG. 15, the coupling pins 20 are released by the lock ring 22 and can be shifted axially in the pin guides 22.2 against the spring force of the coil spring 19. The coil spring 19 is supported on its side opposite the drive spindle 3 by the spring retaining ring 21.1. This enables the maximum transmittable torque to be varied by adjusting torque sleeve 21. As the compression of the coil spring 19 becomes stronger, the torque required to press the coupling pins 20 by the end cams 15.2 on the ring gear 15 axially forward toward the tool holder 32 increases.

Figure 16:
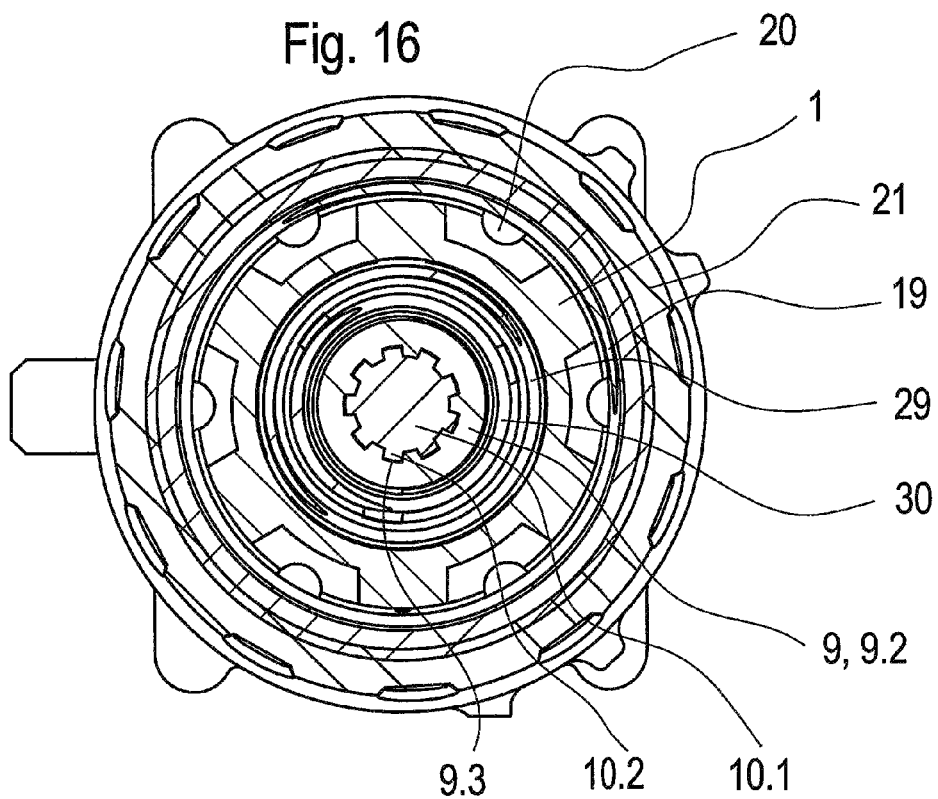

FIG. 16 illustrates that, just as in the drill mode, the drive stem 10 is supported by positive engagement with the drive sleeve 9.2 in the screw mode as well. This figure also shows the coil spring 19 acting on the coupling pins 20, the locking-element spring 23 acting on the locking element 17, and the gripping-element spring 30 acting on the gripping element 18. These can also be tapered toward the drive spindle 3, as illustrated.

Figure 13:
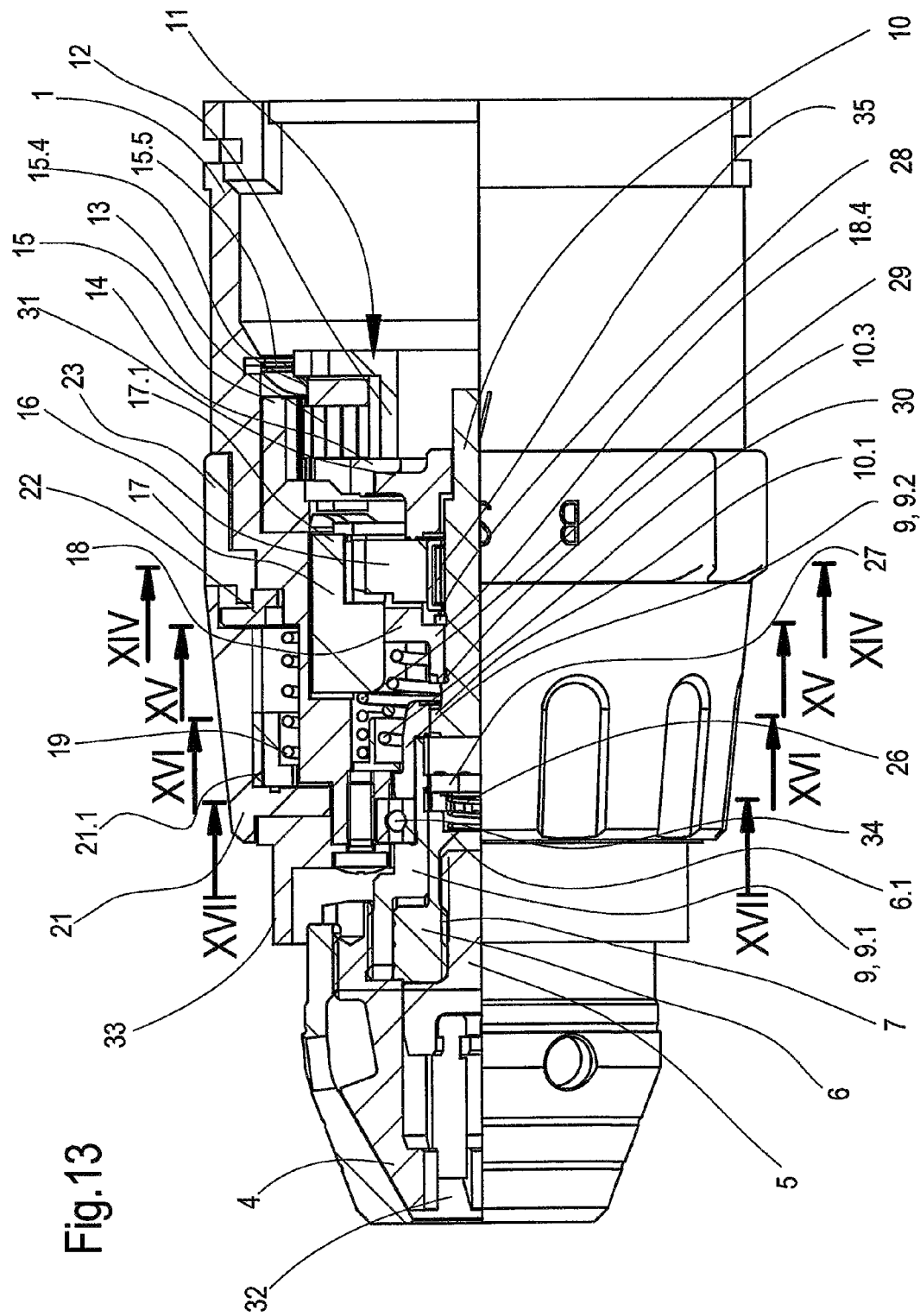
FIG. 13 is a partly sectional side view of the power drill in the screw mode.
Figure 17:
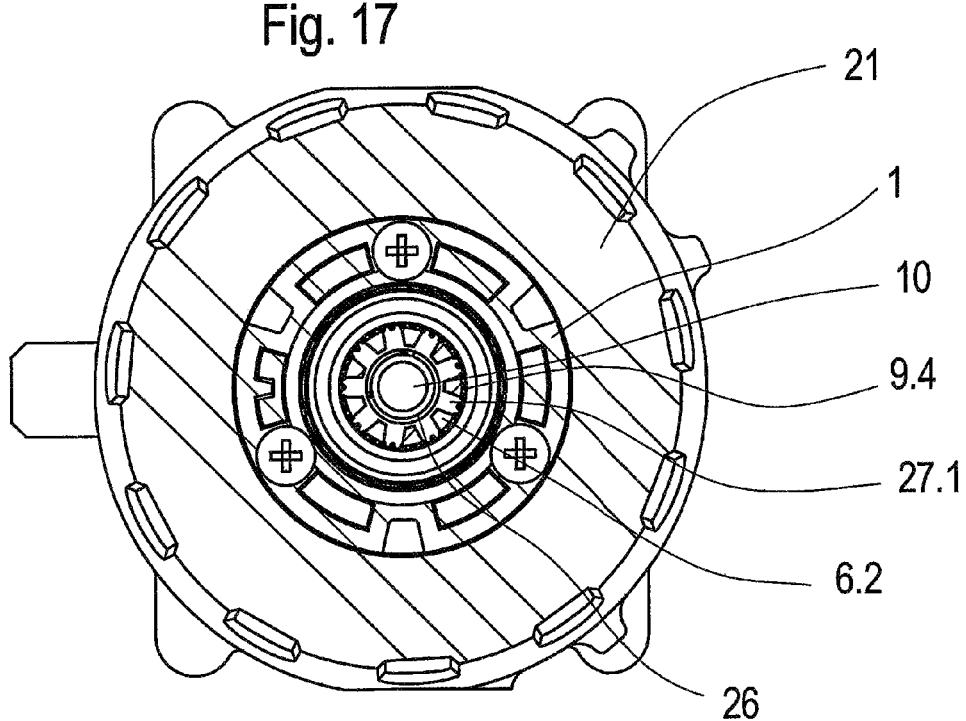

FIGS. 13 and 17 show that the return-element teeth 27.1 of the return element 27 acted upon by the return element spring 26 are engaged with the teeth 6.2 on the threaded sleeve 6. The return element teeth 27.1 are also positively engaged with the spindle teeth 9.4. The force of the motor 2 is transmitted here by the drive spindle 3 through the planetary above 11 to the drive stem 10. The drive-gear teeth 10.2 rotate the stem that in turn drives the drive sleeve 9.2 and the tube shaft 9.1 connected to chuck body 4. At the same time, the threaded sleeve 6 is secured against radial movement by positive engagement of the return-element teeth 27.1 with the spindle teeth 9.4. Rotation of the threaded sleeve 6 relative to the tube shaft 9.1 is thus impossible. If a selectable torque is exceeded in the screw mode, the coupling pins 20 retract past the end cams 15.2 on the end face 15.3 of the ring gear 15, and the ring gear 15 is no longer rotationally fixed relative to the housing 1. Force is no longer transmitted to the drive stem 10 by rotation of the ring gear 15 relative to the housing 1 such that the chuck is not driven further at that instant.

Figure 18:
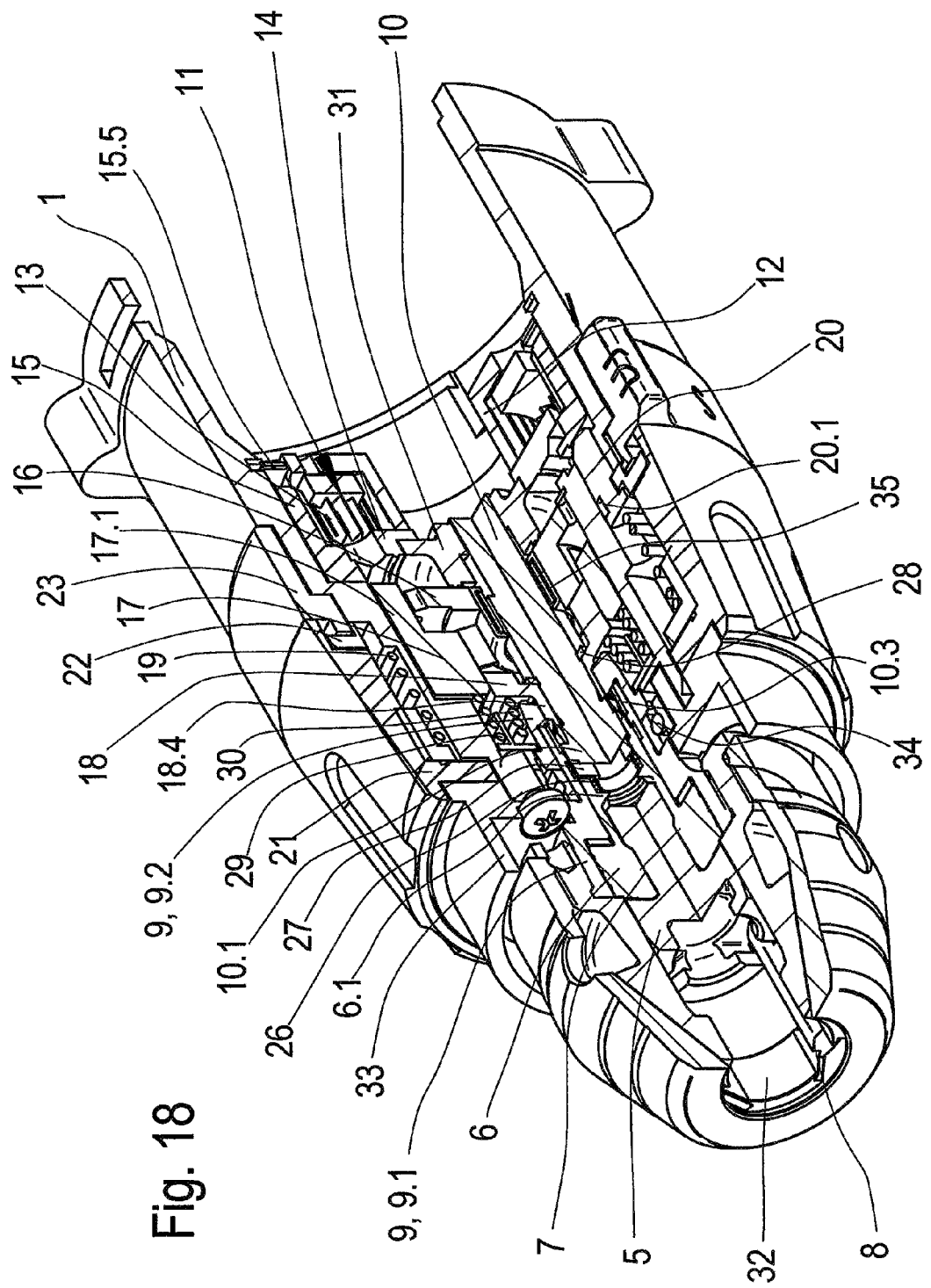
FIG. 18 is a view like FIG. 8 of the power drill in the tighten/loosen mode.
Figure 19:
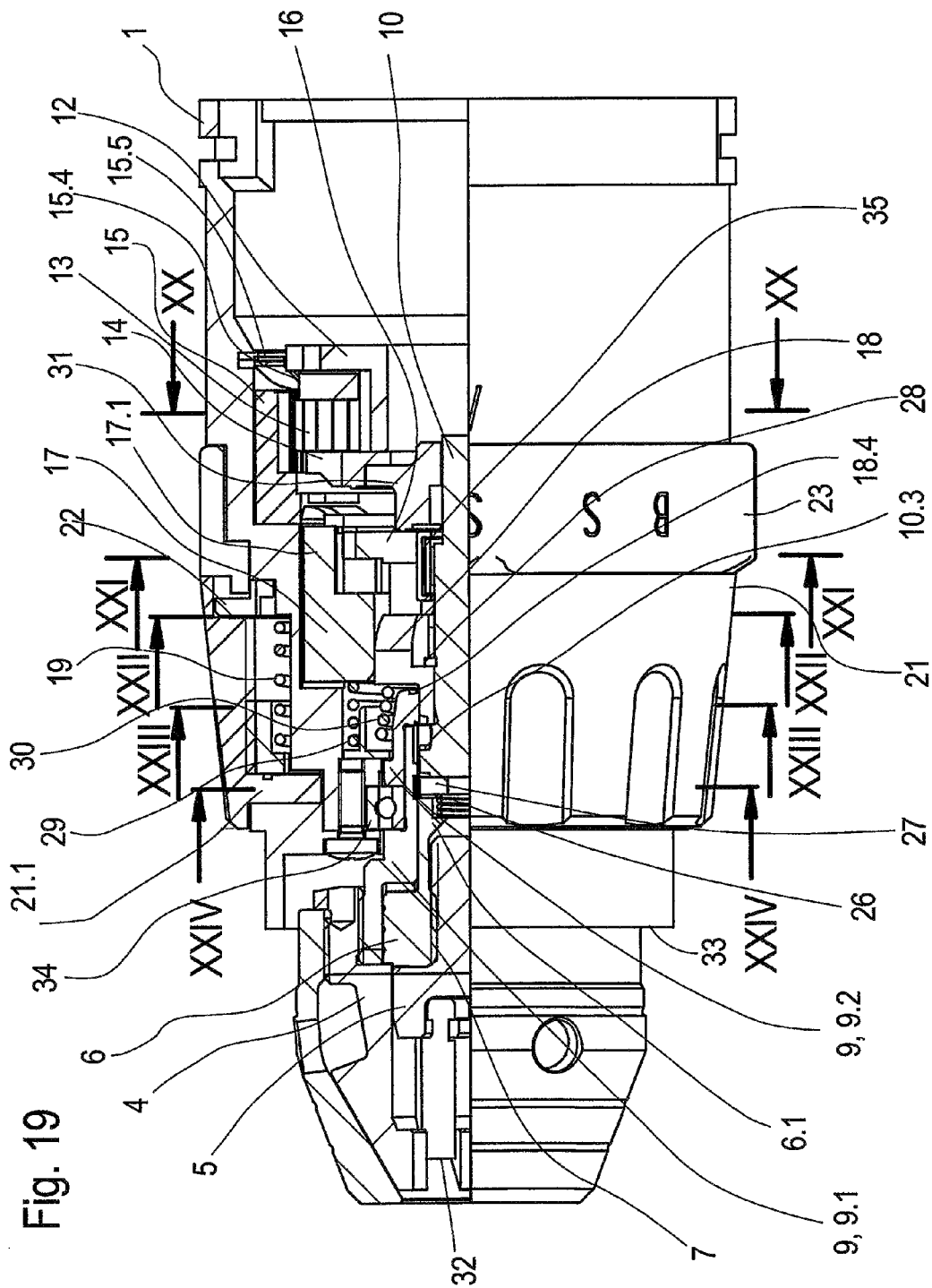
FIG. 19 is a partly sectional side view of the power drill in the tighten/loosen mode.

FIGS. 18 through 24 show the power drill according to the invention in the tighten/loosen mode. Positive engagement becomes effective between the gripping element 18 with its gripping element extension 18.4 and the drive sleeve 9.2 in response to movement of the control element 16 and the resulting axial movement of the gripping element 18 against the force of the gripping-element spring 30, as shown in particular in FIG. 23. A comparison of FIGS. 19 and 13, or FIGS. 19 and 9, shows that the gripping-element spring 30 is compressed in the tighten/loosen mode. Due to the positive engagement of the gripping element 18 and the drive sleeve 9.2, it is held against rotation relative to the housing 1, such that the tube shaft 9.1 and thus the entire chuck body 4 are locked against rotation relative to the housing 1. Since it is entrained by the gripping element 18, the drive stem 10 is positively engaged with the threaded sleeve 6 when the gripping element is moved axially.

Figure 20:
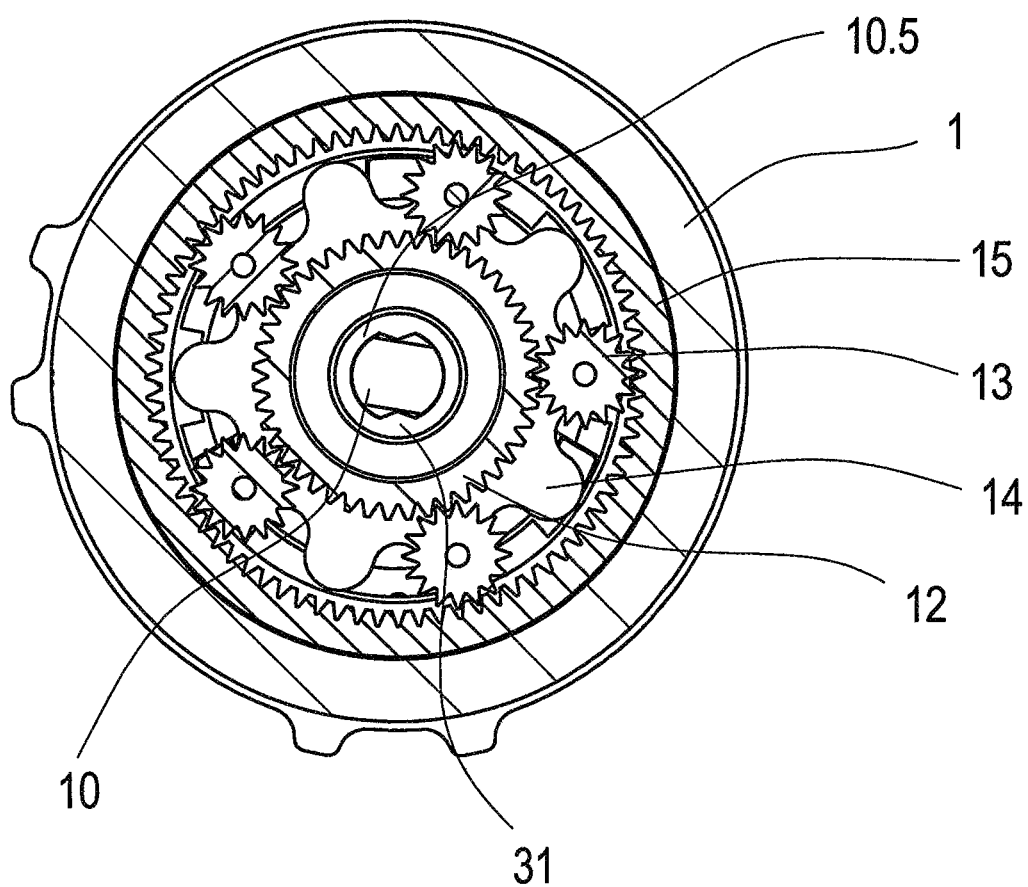

FIG. 20 shows a planetary transmission 11 that has five planet gears 13 disposed on the planet carrier 14. The sun gear 12 meshes with the planet gears 13 that in turn roll in the ring gear 15.

Figure 21:
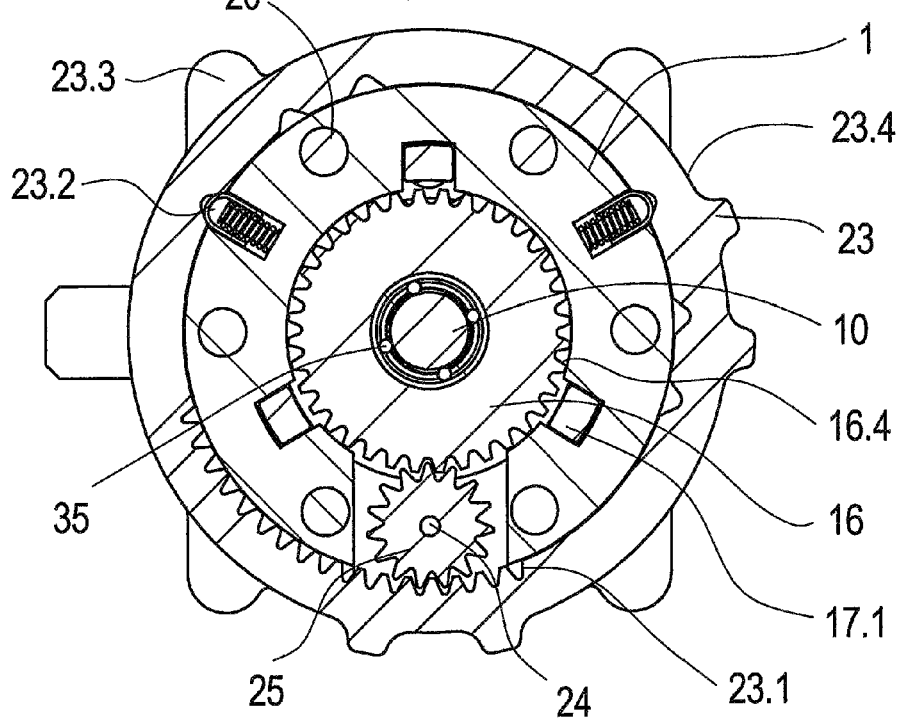

FIG. 21 shows the mode-control sleeve 23 in its position for the tighten/loosen mode. It is furthermore evident here that detents 23.2 are now in both of the third or end detent positions 23.3 associated with the tighten/loosen mode. What is evident once again is the coupling of the mode-control sleeve 23 with the control-element teeth 16.4 via the control gear 25 that is mounted on the bearing shaft 24.

Figure 22:
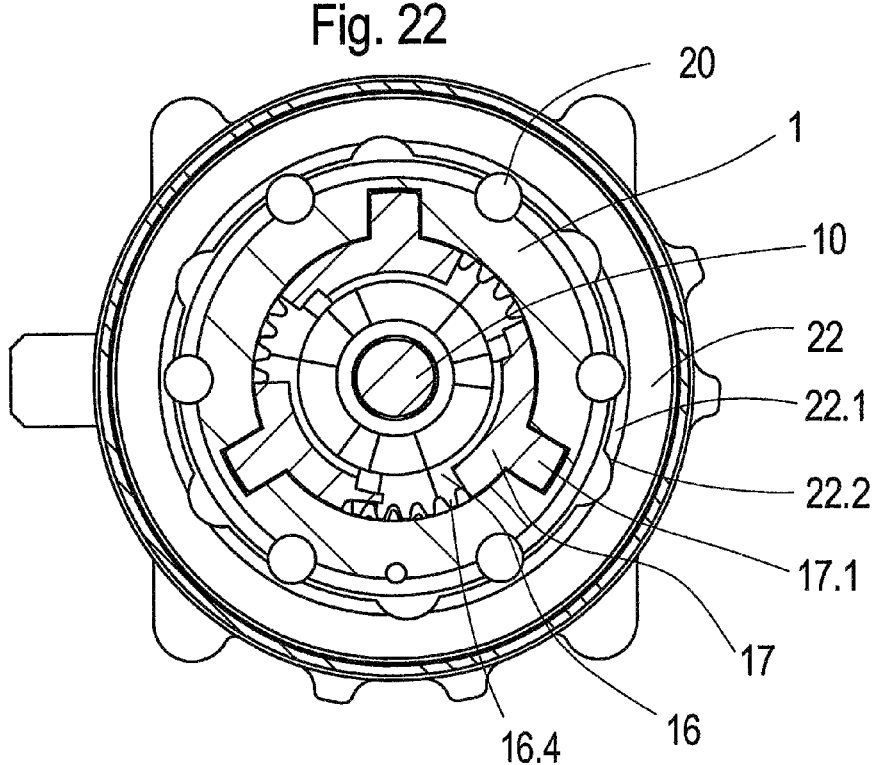

FIG. 22 also shows that in the tighten/loosen mode the coupling pins 20 are also axially fixed by the lock ring 22 and are permanently pressed thereby onto the front end face 15.3 of the ring gear 15. In order to provide its torque-controlled rotationally fixed support relative to the housing 1, the ring gear 15 is supported by the ring gear spring 15.4 provided on its side facing the drive spindle 3, which spring in turn is supported by the circlip 15.5.

FIG. 24 shows that the return element 27 is rotationally fixed with return opposing teeth 6.2 of the threaded sleeve 6 due to movement of the drive stem 10 axially forward against the force of the return spring 26 by its teeth 27.1. The return spring 26 is supported here on the return collar 6.1 provided on the threaded sleeve 6.

In the tighten/loosen mode, the force of the motor 2 is transmitted by the drive spindle 3 through the planetary transmission 11 to the drive stem 10. The drive stem drives the threaded sleeve 6 due to the effective positive engagement. Positive engagement comes into effect between the drive sleeve 9.2, and thus with the tube shaft 9.1, and the gripping element 18, which positive engagement rotationally fixes the chuck body 4 relative to the housing 1. This enables rotation of the threaded sleeve 6 relative to the tube shaft 9.1 that moves the jaws 8 via the threaded connection 7 with the driver 5.

When a selectable torque has been exceeded, the ring gear 15 retracts axially rearwardly against the force of the ring gear spring 15.4 and thus becomes free to turn relative to the housing 1. As a result, the rotation of the drive stem 10 and thus movement of the jaws 8 is stopped.

Now that the constructive design of the power drill has been explained, the following discussion will describe the operation of the device:

It is assumed that the power drill is first found in the drill mode where a tool is clamped by the jaws 8 in the tool holder 32. The detent 23.2 is accommodated in the drill-mode detent position 23.3 of the mode-control sleeve 23 (FIG. 10). The coupling pins 20 are pressed onto end face 15.3 of the ring gear 15 and fixed axially in place. This axial fixing is created by the engagement of shoulder 22.1 of the lock ring 22 in the grooves 20.1 of the coupling pins 20 (FIG. 8). The locking element 17 is moved axially rearward in this mode, with the result that the locking projections 17.1 engage with the latch seats 15.1 of the ring gear 15 and thus the maximum possible torque can be transmitted to the drive stem 10 (FIGS. 8, 9). The drive sleeve 9.2 is positively engaged with the drive stem 10 and is driven by this stem 10. As a result, the chuck body 4 is rotated by means of the at least rotationally fixed connection between the drive sleeve 9.2 and the tube shaft 9.1. The drive stem 10 is itself driven by the motor 2 via the planetary transmission 11 and the drive bushing 31.

After the drilling operation, for example, the drilling tool is to be removed from tool holder 32 and a screw bit is to be installed. To do this, the user rotates the mode-control sleeve 23, with the result that detent 23.2 is moved—beyond the screw-mode detent position 23.3—into the tighten/loosen-mode detent position 23.3. The control gear 25 is rotated by the control-sleeve inner teeth 23.1 of the mode-control sleeve 23 and itself rotates the control element 16 by the control-element teeth 16.4 (FIG. 21). The locking control element 16.2 and the locking element control cam 17.2 interact first when the control element 16 is rotated, with the result that the locking element 17 is moved axially forward against the force of the locking-element spring 29. The locking projections 17.1 thus disengage from the latch seats 15.1 of the ring gear 15. Following this, the gripping control element 16.3 and gripping-element control cam 18.1 interact, with the result that the gripping element 18 is moved axially forward against the force of the gripping-element spring 30. Due to the advancing motion of the gripping element 18, the gripping-element outer teeth 18.3 of the gripping element extension 18.4 engage the teeth 9.3 of the drive sleeve 9.2 (FIGS. 18, 19). The sleeve 9, and with it the tube shaft 9.1 and chuck body 4, are thus rotationally fixed relative to the housing 1. The drive stem 10 is entrained by axial movement of the gripping element 18. The drive stem 10 is now positively engaged with the threaded sleeve 6 and drives the sleeve 6. Whenever the motor 2 is operated in the rotational direction corresponding to loosening, the motor 2 transmits rotation to the drive stem 10, thereby turning the threaded sleeve 6. Due to the rotationally fixing of the chuck body 4 relative to the housing 1, the driver 5 screws in away from the tool holder 32, with the result that the jaws 8 are pulled axially rearward and are moved outward to open due to the standard angled guides on the cone of the chuck body 4, and the drilling tool is released by outward movement of the jaws 8.

A screw bit can now be inserted. To this end, the bit is positioned in the tool holder and the rotational direction of motor 2 is reversed, that is, motor 2 is operated in the rotational direction corresponding to gripping. When a predetermined torque has been exceeded during the gripping action, the ring gear 15 retracts against the force of the ring gear spring 15.4, with the result that the ring gear 15 rotates relative to the housing 1 and the power of motor 2 is no longer transmitted completely to the drive stem 10, in other words, one of the two friction clutches implemented in the power drill activates.

In order now to operate the power drill in the screw mode, the user must rotate the mode-control sleeve 23, with the result that the sleeve's inner teeth 23.1 rotate the control gear 25 and this gear rotates the control element 16. Detent 23.2 is now taken up in the screw-mode detent position 23.3 (FIG. 14). Due to this rotation, the gripping control element 16.3 of the control element 16 again interacts with gripping-element control cam 18.1—specifically, such that the gripping-element spring 30 displaces the gripping element 18 axially rearward. No interaction occurs between the locking control element 16.2 and locking element control cam 17.2 of the locking element 17, with the result that the locking projections 17.1 continue to be disengaged from the latch seats 15.1 of the ring gear 15. The connection between the drive sleeve 9.2 and the gripping element 18 is removed when the control element 16 is rotated, and the drive stem 10 is again moved rearward by movement of the gripping element 18. Now the drive stem 10—as in the drill mode—is again positively engaged with the drill spindle 9.2, with the result that the drive stem 10 drives the chuck body 4. The coupling pins 20 are released by the lock ring 22 in the screw mode. By turning the torque sleeve 21, the user can now select the torque at which this friction clutch activates. When a torque selectable by the user is exceeded by the torque sleeve 21, the coupling pins 20 retract axially from end cams 15.2 of the ring gear 15, with the result that the ring gear 15 is rotated relative to the housing 1. The power of the motor 2 is thereby no longer transmitted completely to the drive stem 10.

When the torques selectable by the two friction clutches have been exceeded, the coupling pins 20 slide over the end cams 15.2 of the ring gear 15. This results in a ratcheting sound that signals to the user that the corresponding predetermined torque has been exceeded. The friction clutches thus also create a torque indicator for the user.

We claim:
1. A power drill comprising:
   a housing;
   a motor in the housing:
   a planetary transmission in the housing, centered on an axis, and including
      a sun gear connected to and rotatable by the motor,
      a rotatable planet carrier,
      a ring gear rotatable outside the planet carrier and having a front face turned axially outward away from the motor and formed with a plurality of axially outwardly projecting cams, and
      at least one planet gear on the planet carrier and meshing with the ring gear and with the sun gear;
   a drive stem rotatable in the housing about the axis and rotationally coupled to the planet carrier;
   a chuck body rotatable on the housing;
   a plurality of adjustable jaws in the chuck body;
   a driver axially bearing on the jaws and axially shiftable to position the jaws;
   a sleeve threaded to the driver and rotatable to position the jaws in the chuck body;
   a mode-control assembly having
      a locking element rotationally fixed and axially displaceable in the housing and having a locking cam,
      a control element interacting with the cam formation on the locking element and having a control cam, and
      a gripping element having a gripping cam interacting with the control cam of the control element,
   the elements of the assembly coupling the drive stem either to the chuck body for rotating a tool held by the jaws in a screw or drill mode or to the sleeve in a tighten/loosen mode for tool exchange;
   a torque-adjustment pin axially shiftable in the housing in one of the modes but not rotatable about the axis and axially engageable with the cams on the front face of the ring gear to inhibit rotation of the ring gear;
   a first spring axially inwardly bearing on the pin in at least one mode for pressing the pin against the front face with an adjustable axially inwardly directed force; and a second spring braced axially between a rear face of the ring gear and the housing and biasing the ring gear axially outward with a second spring force.

2. The power drill defined in claim 1, wherein each of the elements of the control assembly has a central hole through which the drive stem passes.

3. The power drill defined in claim 2, wherein the at least one locking control element is offset radially from the at least one gripping control element relative to the drive stem.

4. The power drill defined in claim 2, wherein the locking element has a locking element guide, and at least one locking-element running surface.

5. The power drill defined in claim 4, wherein in the tighten/loosen mode there is positive engagement between the gripping element and the drill spindle due to axial movement of the gripping element and the spindle is rotationally fixed thereby to the housing, and that the drive stem is positively engaged to the threaded sleeve by being carried by the gripping element.

6. The power drill defined in claim 4, wherein in the tighten/loosen mode there is positive engagement between the gripping element and the drill spindle due to axial movement of the gripping element and the spindle is rotationally fixed thereby to the housing, the drive stem being positively engaged to the threaded sleeve by being entrained by the gripping element, the drill further comprising:
 a lock ring to engage the at least one coupling pin pressed against the end face, the ring gear being supported by the second spring provided on its side facing the motor so as to effect torque-controlled rotationally fixed support relative to the housing.

7. The power drill defined in claim 6, wherein the second spring is supported axially rearwardly on the side facing the motor by a securing shoulder provided on the housing or by a circlip.

8. The power drill defined in claim 1, wherein the gripping element has a gripping element extension having a gripping element outer teeth, and at least one gripping element guide.

\* \* \* \* \*